United States Patent
Stojanovski et al.

(10) Patent No.: US 9,693,275 B2
(45) Date of Patent: *Jun. 27, 2017

(54) TRAFFIC OFFLOAD VIA LOCAL NETWORK

(75) Inventors: Alexandre Saso Stojanovski, Paris (FR); Hyun Sook Kim, Anyang-si (KR); Jae Hyun Kim, Anyang-si (KR); Tae Hyeon Kim, Anyang-si (KR); Lae Young Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

This patent is subject to a terminal disclaimer.

(21) Appl. No.: 14/127,070

(22) PCT Filed: Jun. 15, 2012

(86) PCT No.: PCT/KR2012/004766
§ 371 (c)(1),
(2), (4) Date: Dec. 17, 2013

(87) PCT Pub. No.: WO2012/177023
PCT Pub. Date: Dec. 27, 2012

(65) Prior Publication Data
US 2014/0192640 A1    Jul. 10, 2014

Related U.S. Application Data

(60) Provisional application No. 61/498,555, filed on Jun. 18, 2011.

(51) Int. Cl.
H04W 36/22    (2009.01)
H04W 8/08    (2009.01)
(Continued)

(52) U.S. Cl.
CPC ............. *H04W 36/22* (2013.01); *H04W 8/02* (2013.01); *H04W 8/082* (2013.01);
(Continued)

(58) Field of Classification Search
None
See application file for complete search history.

(56) References Cited

U.S. PATENT DOCUMENTS

2009/0047947 A1    2/2009 Giaretta et al.
2009/0240795 A1    9/2009 Tsirtsis et al.
(Continued)

FOREIGN PATENT DOCUMENTS

CN    101779496 A    7/2010
CN    102056129 A    5/2011
(Continued)

OTHER PUBLICATIONS

Nokie Siemens Networks et al. "LIPA and SIPTO@LN requirement clarification", 3GPP Draft, S2-112778, May 19, 2011.*
(Continued)

*Primary Examiner* — Christopher Crutchfield
*Assistant Examiner* — Tito Pham
(74) *Attorney, Agent, or Firm* — Birch, Stewart, Kolasch & Birch, LLP

(57) ABSTRACT

For traffic offload via a local network, a MME may obtain from a HSS, subscription data including SIPTO related permissions defined on APN basis that indicate SIPTO prohibited, indicate SIPTO allowed excluding SIPTO via Local Network (SIPTO@LN), and/or indicate SIPTO allowed including SIPTO@LN. Then, the MME may obtain information about one or more local Gateways (GWs) capable of offloading selected traffic, such information indicating which of the one or more local GWs provides access to which Packet Data Networks (PDNs), with each PDN being identified by its associated APN. Finally, the MME may process PDN connections and/or PDN disconnections in order to support offloading of the selected traffic. The counterpart UE includes the appropriate means of hardware
(Continued)

and/or software that is configured to support and perform SIPTO@LN.

2 Claims, 4 Drawing Sheets

(51) Int. Cl.
*H04W 8/02* (2009.01)
*H04W 36/00* (2009.01)
*H04W 48/20* (2009.01)
*H04W 28/08* (2009.01)

(52) U.S. Cl.
CPC ....... *H04W 36/0077* (2013.01); *H04W 48/20* (2013.01); *H04W 28/08* (2013.01)

(56) References Cited

U.S. PATENT DOCUMENTS

| | | |
|---|---|---|
| 2012/0008554 A1 | 1/2012 | Kim et al. |
| 2012/0099578 A1 | 4/2012 | Aramoto et al. |
| 2013/0122907 A1* | 5/2013 | Mutikainen ....... H04W 36/0022 455/436 |

FOREIGN PATENT DOCUMENTS

| | | |
|---|---|---|
| CN | 102098798 A | 6/2011 |
| KR | 10-2010-0049625 A | 5/2010 |
| KR | 10-2010-0082193 A | 7/2010 |
| KR | 10-2010-0123922 A | 11/2010 |
| WO | WO 2010/017233 A1 | 2/2010 |
| WO | WO 2010/150734 A1 | 12/2010 |

OTHER PUBLICATIONS

3GPP Standard "3$^{rd}$ Generation Partnership Project; Technical Specification Group Services and System ASpects; Local IP Access and Selected IP Traffic Offload (LIPA-SIPTO) 3GPP TR 23.829, Mar. 29, 2011.*
Alcatel-Lucent et al. "LIMONET—Standalone Local GW selection and addressing", 3GPP draft, S2-112221, Apr. 26, 2011.*
3GPP, "3rd Generation Partnership Project; Technical Specification Group Services and System Aspects; Local IP Access and Selected IP Traffic Offload (LIPA-SIPTO) (Release 10)," 3GPP TR 23.829 V10.0.0 (Mar. 2011), Mar. 29, 2011, pp. 1-43, XP050476492.
Alcatel-Lucent et al., "LIMONET—Standalone Local GW selection and addressing," 3GPP TSG SA WG2 Meeting #84, Apr. 11-15, 2011, TD S2-112221 (e-mail revision 5 of S2-112208), pp. 1-5, XP050631691.
LG Electronics et al., "Key Issue on User Interaction for SIPTO@LN," SA WG2 Meeting #86, Jul. 11-15, 2011, S2-113426, pp. 1-2, XP050548699.
Motorola Solutions, "On getting user permission for SIPTO@LN," 3GPP TSG SA WG2 Meeting #84, Apr. 11-15, 2011, TD S2-111646, pp. 1-6, XP050631598.
Nokia Siemens Networks et al., "LIPA and SIPTO@LN requirement clarification," 3GPP TSG SA WG2 Meeting #84, Apr. 11-15, 2011, TD S2-112778, pp. 1-6, XP050525668.
Qualcomm Incorporated, "Architecture and gateway selection for SIPTO at the local network," 3GPP TSG SA WG2 Meeting #84, Apr. 11-15, 2011, TD S2-112176 was S2-112079 was 1397, 3 pages, XP050682844.
LG Electronics, "On solutions for SIPTO for the H(e)NB subsystem," 3GPP TSG SA WG2 Meeting #85, TD S2-112442, May 16-20, 2011, pp. 1-5.
Alcatel-Lucent et al., 3GPP Draft, "LIMONET—Standalone Local GW selection and addressing," 3GPP TSG SA WG2 Meeting #84, Apr. 11-15, 2011, TD S2-112221 (e-mail revision 5 of S2-112208), pp. 1-5.
Nokia Siemens Networks et al., 3GPP Draft, "LIPA and SIPTO@LN requirement clarification," 3GPP TSG SA WG2 Meeting #84, Apr. 11-15, 2011, TD S2-112778, pp. 1-6.
Motorola Solutions et al., "Some architecture principles for SIPTO@LN," 3GPP TSG SA WG2 Meeting #84, TD S2-111821, Bratislava, Slovakia, Apr. 11-15, 2011, pp. 1-2.

* cited by examiner

Fig. 1

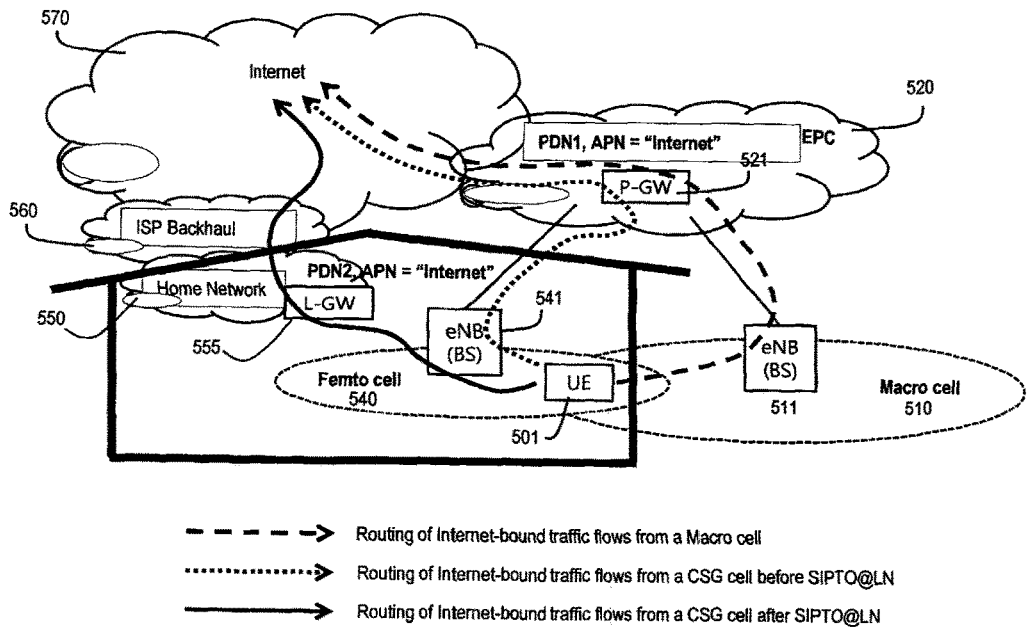

- - - - →  Routing of Internet-bound traffic flows from a Macro cell
·········▶  Routing of Internet-bound traffic flows from a CSG cell before SIPTO@LN
⎯⎯⎯⎯→  Routing of Internet-bound traffic flows from a CSG cell after SIPTO@LN

Fig. 2a

| Field | Description |
|---|---|
| IMSI | IMSI is the main reference key. |
| MSISDN | The basic MSISDN of the UE (Presence of MSISDN is optional). |
| IMEI / IMEISV | International Mobile Equipment Identity - Software Version Number |
| MME Identity | The Identity of the MME currently serving this MS. |
| MME Capabilities | Indicates the capabilities of the MME with respect to core functionality e.g. regional access restrictions. |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/ Serving GW / PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |
| RFSP Index | An index to specific RRM configuration in the E-UTRAN |
| URRP-MME | UE Reachability Request Parameter indicating that UE activity notification from MME has been requested by the HSS. |
| CSG Subscription Data | The CSG Subscription Data is a list of CSG IDs per PLMN and for each CSG ID optionally an associated expiration date which indicates the point in time when the subscription to the CSG ID expires; an absent expiration date indicates unlimited subscription.<br>For a CSG ID that can be used to access specific PDNs via Local IP Access, the CSG ID entry includes the corresponding APN(s). |
| VPLMN LIPA Allowed | Specifies per PLMN whether the UE is allowed to use LIPA. |
| Subscribed Periodic RAU/TAU Timer | Indicates a subscribed Periodic RAU/TAU Timer value |
| MPS CS priority | Indicates that the UE is subscribed to the eMLPP or 1x RTT priority service in the CS domain. |
| UE-SRVCC- Capability | Indicates whether the UE is UTRAN/GERAN SRVCC capable or not. |
| MPS EPS priority | Indicates that the UE is subscribed to MPS in the EPS domain. |

Fig. 2b

| Context Identifier | Index of the PDN subscription context. |
|---|---|
| PDN Address | Indicates subscribed IP address(es). |
| PDN Type | Indicates the subscribed PDN Type (IPv4, IPv6, IPv4v6) |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| Access Point Name (APN) | A label according to DNS naming conventions describing the access point to the packet data network (or a wildcard) (NOTE 6). |
| SIPTO permissions | Indicates whether the traffic associated with this APN is allowed or prohibited for SIPTO |
| LIPA permissions | Indicates whether the PDN can be accessed via Local IP Access. Possible values are: LIPA-prohibited, LIPA-only and LIPA-conditional. |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |
| EPS PDN Subscribed Charging Characteristics | The charging characteristics of this PDN Subscribed context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |
| PLMN of PDN GW | Identifies the PLMN in which the dynamically selected PDN GW is located. |
| Homogenous Support of IMS Over PS Sessions for MME | Indicates whether or not "IMS Voice over PS Sessions" is supported homogeneously in all TAs in the serving MME. |
| List of APN - PDN GW ID relations (for PDN subscription context with wildcard APN): | |
| APN - P-GW relation #n | The APN and the identity of the dynamically allocated PDN GW of a PDN connection that is authorised by the PDN subscription context with the wildcard APN. The PDN GW identity may be either an FQDN or an IP address. The PDN GW identity refers to a specific PDN GW. |

Fig. 3

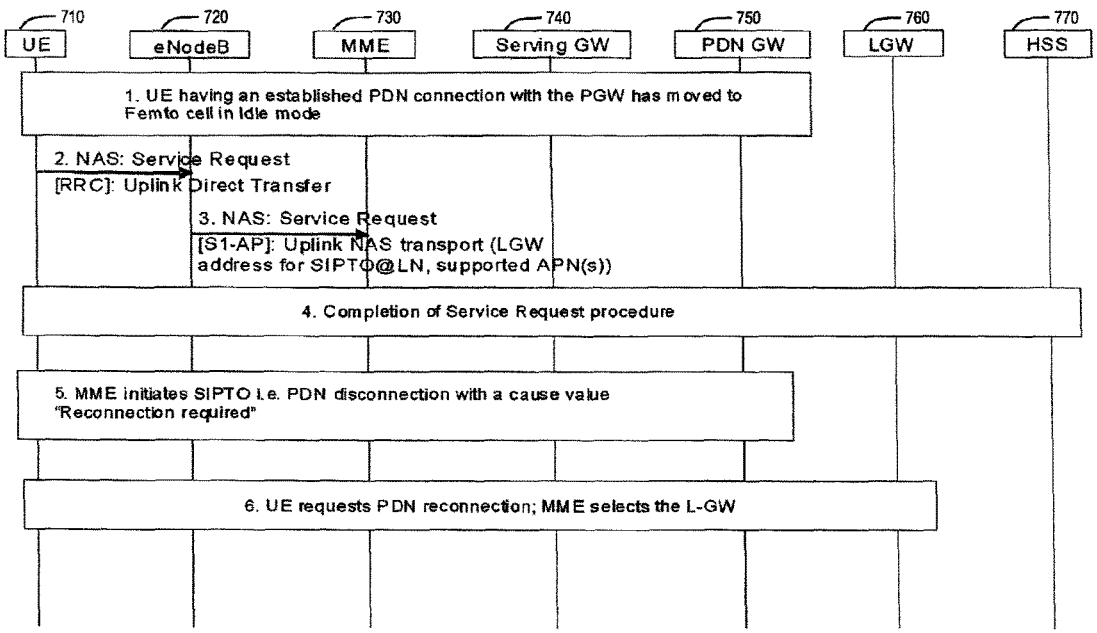

TRAFFIC OFFLOAD VIA LOCAL NETWORK

CROSS REFERENCE TO RELATED APPLICATIONS

This non-provisional application is a National Stage entry under U.S.C. §371 of International Application No. PCT/KR2012/004766 filed on Jun. 15, 2012, which claims the benefit of U.S. Provisional Application No. 61/498,555 filed on Jun. 18, 2011. The entire contents of all of the above applications are hereby incorporated by reference.

TECHNICAL FIELD

The present invention relates to a method of controlling traffic offload via local network

BACKGROUND ART

In the related art, traffic offload via a local network techniques were not adequate. As such, the related art technologies do not sufficiently address such issues, and thus do not offer appropriate solutions.

DISCLOSURE OF INVENTION

Solution to Problem

The present inventors recognized at least the above-identified drawbacks of the related art. Based upon such recognition, the various features described hereafter have been conceived such that certain procedures related to traffic offload via local network techniques are more efficiently and effectively performed. In particular, particular techniques and concepts to support Selected IP Traffic Offload (SIPTO) at a local network have been conceived and implemented. As a result, service continuity for selected IP traffic offload can be achieved.

BRIEF DESCRIPTION OF DRAWINGS

FIG. 1 shows some exemplary concepts related to Internet access from macro cell vs. Internet access from Femto cell (before and after performing SIPTO@LN) for the invention embodiments.

FIGS. 2a and 2b show a table containing exemplary information storage in the HSS for the invention embodiments.

FIG. 3 shows some exemplary concepts related to a call flow illustrating the impacted S1-AP messages for the invention embodiments.

MODE FOR THE INVENTION

Figure 4:
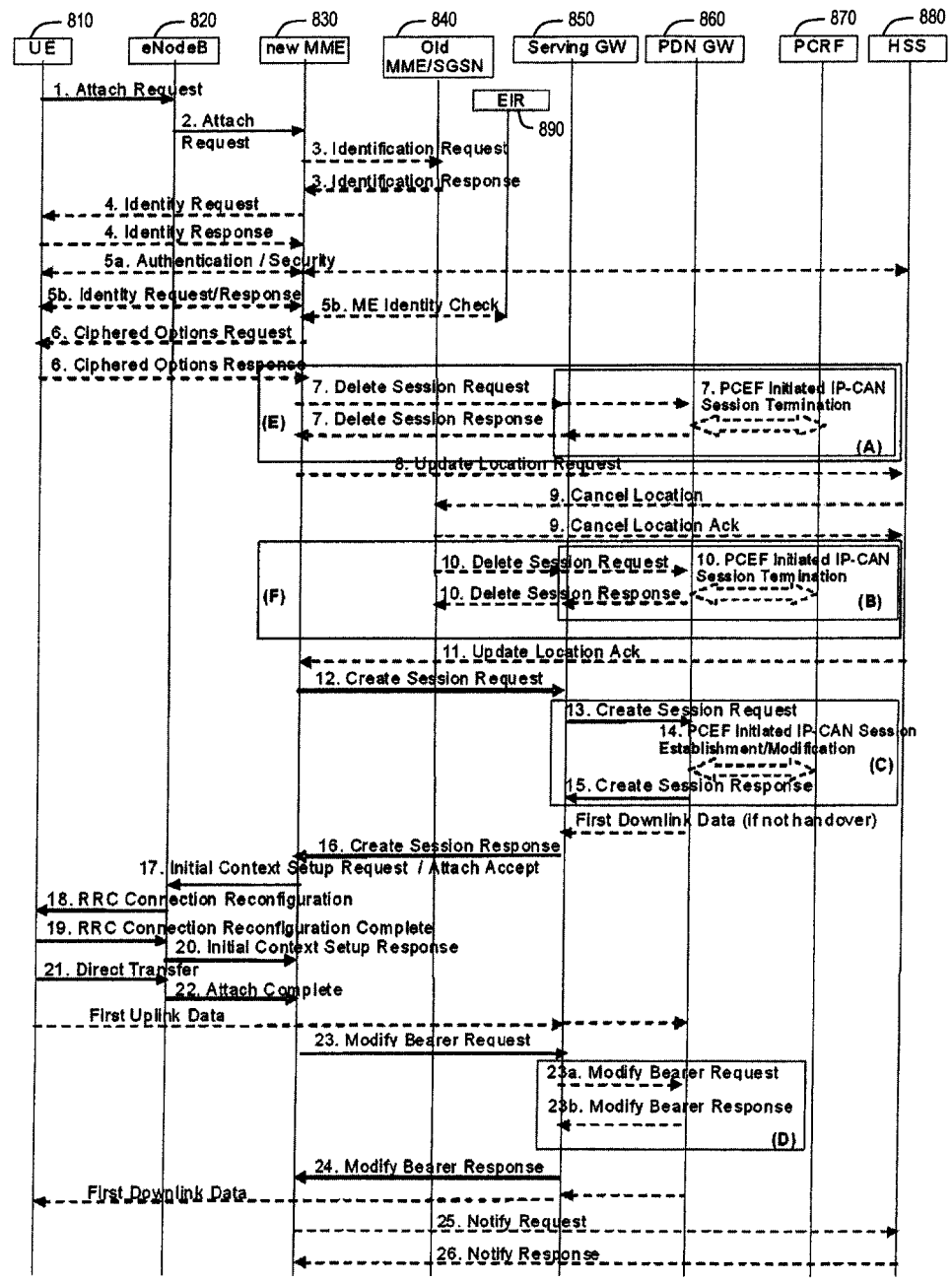
FIG. 4 shows some exemplary call flows for E-UTRAN Initial Attach and UE requested PDN connectivity procedures for the invention embodiments.

The inventive concepts and features herein are generally explained in terms of 3GPP Universal Mobile Telecommunication System (UMTS)/Evolved Packet System (EPS) technology. However, such details are not meant to limit the various features described herein, which are applicable to other types of mobile and/or wireless (radio) communication systems and methods.

Hereafter, some aspects about (cellular) traffic offload via a Local Network residing on customer premises will be described.

Selected IP Traffic Offload (SIPTO) is a 3GPP Release 10 (Rel-10) feature allowing the operator to offload user's traffic by selecting a Packet Data Gateway (PGW) residing close to the Evolved Packet Core (EPC) network edge.

Local IP Access (LIPA) is a 3GPP Rel-10 feature providing access to resources on the Local Network (LN) (i.e. the network located inside the customer's home or enterprise premises) via a Femto cell (a.k.a. Home (e)NodeB).

In 3GPP Rel-11 there is an ongoing work item referred to as LIMONET (see TR 23.859) aiming at enhancing the LIPA and SIPTO features.

Specifically related to SIPTO enhancements, the Rel-11 work item aims at defining a solution that would allow the operator to offload user's traffic on the Local Network (LN) inside the customer premises. This type of offload is shortly referred to as SIPTO@LN.

In contrast to Rel-10 LIPA, whose aim is to provide access to resources on the local network itself, the Rel-11 SIPTO@LN feature aims at providing access to external networks (e.g. the Internet) via the local network (the underlying assumption being that the Local Network eventually has connectivity towards the desired external network).

In comparison to Rel-10 SIPTO, the Rel-11 SIPTO@LN feature may impact the user experience, given that the Local Network may not have some functionality that is present in the operator's EPC network (e.g. parental control, website accelerators, compression engines, etc). Acknowledging that this potential change in user experience before and after offload may not be acceptable to all users, there is a requirement that the network should be able to seek user's consent before offloading the traffic, based on operator policies.

This invention disclosure proposes several architecture enablers in order to address the requirements of the Rel-11 SIPTO@LN feature. Namely, it is proposed to enhance the user's subscription information in the HSS, as well as to enhance the signalling capability of the Home (e)NodeB subsystem on the S1/Iu interface.

FIG. 1 shows Internet access from macro cell vs. Internet access from Femto cell (before and after performing SIPTO@LN).

Namely, FIG. 1 shows a scenario where the UE 501 can access the Internet 570 in three different ways:

First, when the user is outside his home and connected to a macro cell 510, the UE 501 establishes a PDN connection (PDN1) associated with the APN that is used for access to the Internet (e.g. APN="Internet"). The network may decide to SIPTO this PDN connection by requesting a disconnection+reconnection (a Rel-10 mechanism) and selecting a PGW that is closer to the network edge upon PDN reconnection.

Second, when the user enters his home, the PDN connection (PDN1) is handed over to the home Femto cell 540. As previously, the network may again decide to SIPTO this PDN connection by requesting a disconnection+reconnection in order to select a PGW that is closer to the network edge, nevertheless, the PGW still remains located inside the EPC 520.

Third, if the network knows that the Local Gateway (L-GW) 555 residing on the customer premises (home network 550) has unrestricted connectivity to the Internet (e.g. by relying on the Internet Service Provider's backhaul network 560), it may decide to trigger disconnection+reconnection, and this time select the L-GW upon reconnection (instead of selecting a PGW residing in the EPC 520). Such a PDN connection is referred to as PDN2 in FIG. 1.

The third case described above (i.e. access to the Internet via the Local Gateway) is actually a perfect use case example for the Rel-11 SIPTO@LN feature, in that, based on network's initiative, the user's Internet-bound traffic is offloaded via the Local Network.

As mentioned in the introduction, SIPTO@LN may require user's consent due to the possible service alteration subsequent to offload. This consent may be part of the subscription information, but it may also involve a real-time interaction with the user, depending on operator's policies and the terminal capabilities.

The embodiments of this disclosure address the scenario described for the case where the user's Internet-bound traffic is offloaded via the Local Network (i.e. via a Local Gateway).

Embodiments of this invention propose two enablers for SIPTO@LN:

Enhancement to the user's subscription information in the HSS by enhancing the SIPTO Permissions flag associated to a specific Access Point Name (APN);

Enhancement to the S1-AP signalling indicating whether the Local Gateway (L-GW) is capable for traffic offload via the Local Network.

FIGS. 2a-2b show a table of exemplary information storage in the HSS. As seen from the table, each PDN subscription context currently contains a SIPTO Permissions flag associated to it. This flag contains binary information indicating whether the traffic associated with this APN is allowed or prohibited for SIPTO.

As previously explained, with Rel-11 SIPTO@LN the user experience before and after offload may not be the same, due to possible lack of parental control, etc. for the traffic offloaded on the Local Network, which may not be acceptable to some users.

It is therefore proposed to enhance the SIPTO Permissions flag so that for traffic that is authorized for Rel-10 SIPTO, it is in addition indicated whether it is also authorized for Rel-11 SIPTO@LN.

Only if the traffic associated to a specific APN is authorized for SIPTO@LN will the EPC network attempt to offload such traffic via the Local Network. Note that the decision for offloading may or may not involve a real-time interaction with the user, depending on the operator's policies and terminal capabilities. The real-time interaction can be performed by using specific the NAS signaling messages.

The following table shows an example of the [S1-AP] UPLINK NAS TRANSPORT message content.

This message and some other S1-AP protocol messages are used in Rel-10 specifications for conveying the L-GW address on the S5 reference point termination for the Local Gateway that is used for LIPA.

In order to enable the SIPTO@LN feature, it is proposed to enhance this information so that it indicates whether the L-GW has the capability to provide offload for selected traffic (i.e. whether it has connectivity to the packet data network which serves as the destination for the offloaded traffic):

This signaled information can be APN-specific if the L-GW has the capability for offloading traffic associated with specific APNs only;

Given that the most likely candidate for offload is traffic bound to the Internet, the L-GW may have a special (non-APN specific) indication that it is capable for offloading of Internet traffic, without having to signal this as APN-specific information. In this case the underlying assumption is that the MME knows which APNs are used to provide access to the Internet.

It should be noted that the Local Gateway used for LIPA may be different from the Local Gateway used for SIPTO@LN, in which case the information for these two is signalled separately in the S1-AP messages.

The solution description in this disclosure is made for the E-UTRAN case (i.e. HeNB), but can be adapted in straightforward manner to the case where UTRAN (i.e. HNB) connects to the Evolved Packet Core (EPC).

FIG. 3 shows an example call flow illustrating the impacted S1-AP messages. The depicted example of the UE triggered Service Request procedure that may comprise the following steps:

1. It is assumed that the UE 710 with established PDN connection(s) has moved from a macro cell to a Femto cell in Idle mode.

2. UE wishes to move to Connected mode by invoking the Service Request procedure by sending a NAS Service Request message to the eNodeB 720.

3. The [NAS] Service Request message is transparently conveyed from the eNodeB 720 to the MME 730 in the [S1-AP] UPLINK NAS TRANSPORT message. Also piggybacked on this message is information on Local Gateway that is capable of offloading traffic, either for specific APN(s) or for Internet traffic. The MME 730 stores this information.

4. Completion of the Service Request procedure.

5. Based on the information received in step 2, and provided that the SIPTO permission flag in the UE context allows for SIPTO@LN for this specific APN, the MME 730 initiates the SIPTO procedure i.e. PDN disconnection with a cause "Reconnection required".

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| NAS-PDU | M | | 9.2.3.5 | | YES | reject |
| E-UTRAN CGI | M | | 9.2.1.38 | | YES | ignore |
| TAI | M | | 9.2.3.16 | | YES | ignore |
| GW Transport Layer Address | O | | Transport Layer Address 9.2.2.1 | Indicating GW Transport Layer Address if the GW is collocated with eNB | YES | ignore |

6. When the UE requests PDN reconnection, the MME 730 selects the L-GW 760.

A similar call flow can be drawn for the handover scenario i.e. when a UE with established PDN connection is handed over from a macro cell to a Femto cell. In this case the information on SIPTO@LN support is carried over S1-MME inside the [S1-AP] Handover Request Acknowledge message, [S1-AP] Handover Notify message or [S1-AP] Path Switch Request message. The message choice depends on the type of handover (S1-based vs. X2-based) and the urgency of providing the information for SIPTO@LN support to the MME.

For the case where the UE attaches from the Femto cell, the impacted message is [S1-AP] UE Initial Message.

In reference to FIG. 4 (that depicts E-UTRAN Initial Attach), the impacted step is step 2. If the eNodeB supports SIPTO@LN, it includes information about the L-GW(s) residing in the local network that are capable for selective traffic offload in the Initial UE message to the MME (e.g. L-GW address and supported APN(s) or a non-APN specific indication for offload of Internet traffic).

It should be noted that FIG. 4 depicts some signal flows as solid arrows to indicate that such are necessary, while other signal flows are shown as dotted arrows to denote that such may or may not always need to be performed.

The UE 810 sends an Attach Request message to the eNodeB 820, which delivers such message to the new MME 830 (steps 1 and 2). The new MME 830 cooperates with the old MME/SGSN 840 to send an Identification Request message and receive an Identification Response message (step 3). Then, the new MME 830 sends an Identity Request message to the UE 810, which responds with an Identity Response message (step 4). As a result, an Authentication/Security procedure is performed between the UE 810, the new MME 830 and the HSS 880 (step 5a). Further, the new MME 830 performs an Identity Request/Response procedure with the UE 810 and performs an ME Identity Check procedure with the EIR 890 (step 5b). Then, the new MME 830 sends a Ciphered Options Request message to the UE 810, which responds with a Ciphered Options Response message (step 6).

Thereafter, the new MME 830 cooperates with various network entities for session deletion (procedure (E)). Namely, the new MME 830 sends a Delete Session Request message to the PDN GW 860 via the Serving GW 850, and receives a Delete Session Response message from the PDN GW 860 via the Serving GW 850 (step 7). Additionally, the PDN GW 860 cooperates with the PCRF 870 to perform a PCEF Initiated IP-CAN Session Termination procedure (shown as part of procedure (A)).

In step 8, an Update Location Request message is sent by the new MME 830 to the HSS 880, which performs a cancel location procedure with the old MME/SGSN 840 by exchanging a Cancel Location (request) message and a Cancel Location ACK message (step 9).

Then, the old MME/SGSN 840 cooperates with various network entities for session deletion (procedure (F)), which is similar to the session deletion procedure (E). Namely, the old MME/SGSN 840 sends a Delete Session Request message to the PDN GW 860 via the Serving GW 850, and receives a Delete Session Response message from the PDN GW 860 via the Serving GW 850 (step 10). Additionally, the PDN GW 860 cooperates with the PCRF 870 to perform a PCEF Initiated IP-CAN Session Termination procedure (shown as part of procedure (B)).

Thereafter, the HSS 880 sends an Update Location ACK message to the new MME 830 (step 11), and in response, the new MME 830 sends a Create Session Request message to the Serving GW 850 (step 12). As a result, the Serving GW 850 sends a Create Session Request message to the PDN GW 860, which cooperates with the PCRF 870 to perform a PCEF Initiated IP-CAN Session Establishment/Modification procedure, and the PDN GW 860 sends a Create Session Response message back to the Serving GW 850 (procedure (C): steps 13 through 15).

Then, the PDN GW 860 can send First Downlink Data (if not handover) to the Serving GW 850. In step 16, the Serving GW 850 sends a Create Session Response message to the new MME 830, which then sends an Initial Context Setup Request/Attach Accept message to the eNodeB 820 (step 17). The eNodeB 820 then sends an RRC Connection Reconfiguration message to the UE 810, which responds with an RRC Connection Reconfiguration Complete message, which in turn allows that eNodeB 820 to send an Initial Context Setup Response message to the new MME 830 (steps 18 through 20).

Thereafter, the UE 810 performs a Direct Transfer procedure to the eNodeB 820, which then sends an Attach Complete message to the new MME 830 (steps 21 and 22). Here, First Uplink Data may be sent from the UE 810 to the Serving GW 850, which can then deliver such to the PDN GW 860. Then, the new MME 830 sends a Modify Bearer Request message to the Serving GW 850 (step 23), which can then perform a Modify Bearer Request/Response procedure with the PDN GW 860 (steps 23a and 23b of procedure (D)), and respond to the new MME 830 by sending a Modify Bearer Response message back thereto (step 24).

Finally, First Downlink Data can be sent from the PDN GW 860 to the UE 810 via the Serving GW 850, and the new MME 830 can send a Notify Request message to the HSS 880, which can respond with a Notify Response message back to the new MME 830 (steps 25 and 26).

Figure 5:
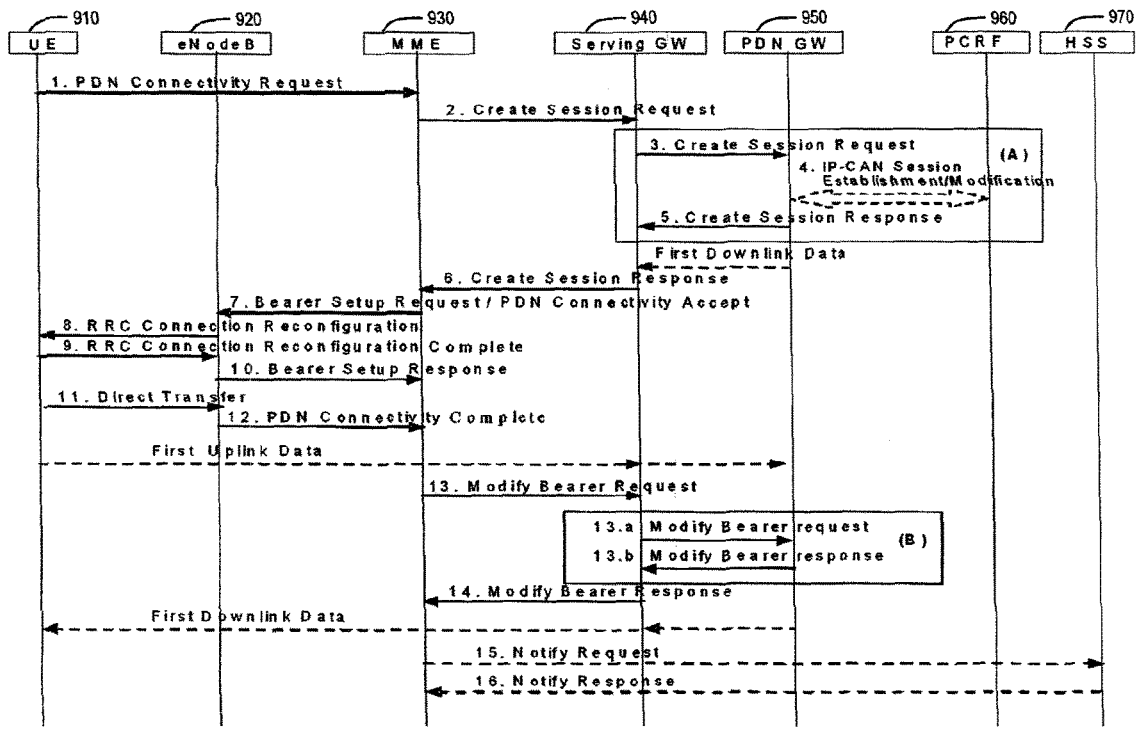
FIG. 5 depicts an exemplary signal flow for UE requested PDN connectivity procedures for the invention embodiments.

In reference to FIG. 5 (UE requested PDN connectivity procedure) the impacted step is step 1. If the HeNB supports SIPTO@LN, it includes information about the L-GW(s) residing in the local network that are capable for selective traffic offload in the Uplink NAS transport message to the MME (e.g. L-GW address and supported APN(s) or a non-APN specific indication for offload of Internet traffic).

It should be noted that FIG. 5 depicts some signal flows as solid arrows to indicate that such are necessary, while other signal flows are shown as dotted arrows to denote that such may or may not always need to be performed.

The UE 910 sends a PDN Connectivity Request message to the MME 930 (step 1), which then delivers a Create Session Request message to the Serving GW 940 (step 2). Then, procedure (A) is performed among the Serving GW 940, the PDN GW 950, and the PCRF 960. Namely, the Serving GW 940 sends a Create Session Request message to the PDN GW 950 (step 3), which cooperates with the PCRF 960 to performs an IP-CAN Establishment/Modification procedure. Then, the PDN GW 950 sends a Create Session Response message back to the Serving GW 940. Here, First Downlink Data may be send from the PDN GW 950 to the Serving GW 940.

Then, the Serving GW 940 sends a Create Session Response message to the MME 930 (step 6), which then sends a Bearer Setup Request/PDN Connectivity Accept message to the eNodeB 920 (step 7). As a result, the eNodeB 920 sends an RRC Connection Reconfiguration message to the UE 910, which responds with an RRC Connection Reconfiguration Complete message sent back to the eNodeB 920 (steps 8 and 9).

Thereafter, the eNodeB 920 sends a Bearer Setup Response message to the MME 930 (step 10), the UE 910 then performs Direct Transfer to the eNodeB 920 (step 11), and the eNodeB 920 sends a PDN Connectivity Complete message to the MME 930 (step 12). Here, the UE 910 can also send First Uplink Data to the PDN GW via the Serving GW.

Accordingly, the MME 930 sends a Modify Bearer Request message to the Serving GW 940 (step 13), which cooperates with the PDN GW 950 to perform a Modify Bearer Request/Response procedure (steps 13a and 13b in procedure (B)). As a result, the Serving GW 940 sends a Modify Bearer Response message back to the MME 930 (step 14). Here, the PDN GW 950 can sends First Downlink Data to the UE 910 via the Serving GW 940.

Finally, the MME 930 can send a Notify Request message to the HSS 970, which can respond with a Notify Response message send back to the MME 930 (steps 15 and 16).

In summary, the embodiments of the invention provide a method comprising: obtaining, by a Mobility Management Entity (MME) from a Home Subscriber Server (HSS), subscription data including Selected IP Traffic Offload (SIPTO) related permissions defined on Access Point Name (APN) basis that indicate at least one among situations comprising SIPTO prohibited, SIPTO allowed excluding SIPTO via Local Network (SIPTO@LN), and SIPTO allowed including SIPTO@LN; receiving, by the MME, information about one or more local Gateways (GWs) capable of offloading selected traffic, said information indicating which of the one or more local GWs provide access to which Packet Data Networks (PDNs), with each PDN being identified by its associated APN; and processing, by the MME, PDN connections and/or PDN disconnections in order to support said offloading of said selected traffic.

The processing step may comprise: performing, by the MME with a User Equipment (UE), a PDN disconnection with request for subsequent reconnection; and when the UE attempts reconnection, selecting, by the MME, one of the local GWs based on the obtained subscription data and the received information about the one or more local GWs. Alternatively, the processing step may comprise: based on a decision by the MME to perform SIPTO@LN for said PDN connections, initiating deactivation, by the MME, of said PDN connections by sending to the UE a Deactivate Bearer Request message indicating that reactivation is required for said PDN connections; and when the UE attempts reactivation, selecting, by the MME, one of the local GWs based on the obtained subscription data and the received information about the one or more local GWs.

It should be noted that if all PDN connections of the UE need to be SIPTO-ed, detaching the UE by the MME with indication reattach requested, denotes that a cause value (such as "explicit detach with reattach required") is included in DetachRequest message.

The "SIPTO allowed including SIPTO@LN" permission may include implicit user consent or explicit user consent. A single local GW can have multiple APNs. One or more local GWs may be reachable by a Home eNodeB (eNB). A same local GW may support both SIPTO and Local IP Access (LIPA). Also, APN information may be received by the MME from a Home eNB, that provides a list of GWs. If APN information is not received from the Home eNB, then the MME is assumed to know which APNs are used to provide access to the Internet.

It should be noted that, through use of a S1-AP protocol Uplink NAS Transport message, indication about the local GWs providing access to external packet data networks associated with specific APNs can be provided. For a more common case, only a flag that indicates "Internet" may be needed (i.e. the MME needs to know the APN for Internet: operator may configure MME). Also, the GW for SIPTO@LN can be the same as the GW for LIPA. Additionally, SIPTO@LN is performed, if the HSS data and the information about local GWs allows for SIPTO@LN.

Figure 6:
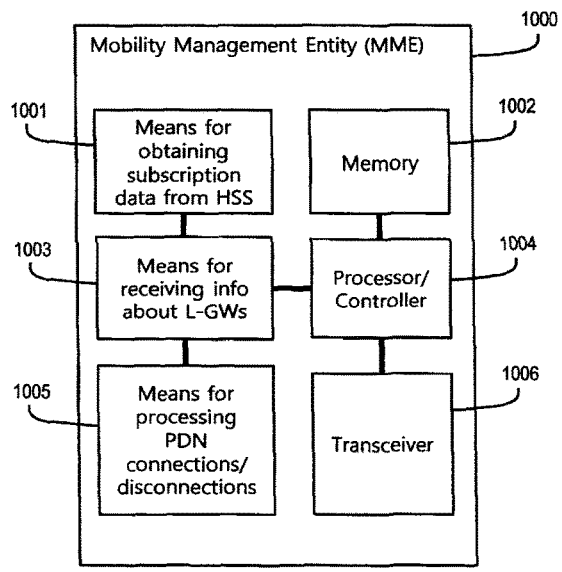
FIG. 6 shows an exemplary MME that can be used to implement the invention embodiments.

Additionally, as shown in FIG. 6, embodiments of the invention provide a Mobility Management Entity (MME) comprising: means for obtaining, from a Home Subscriber Server (HSS), subscription data including Selected IP Traffic Offload (SIPTO) related permissions defined on Access Point Name (APN) basis that indicate at least one among situations comprising SIPTO prohibited, SIPTO allowed excluding SIPTO via Local Network (SIPTO@LN), and SIPTO allowed including SIPTO@LN; means for receiving information about one or more local Gateways (GWs) capable of offloading selected traffic, said information indicating which of the one or more local GWs provide access to which Packet Data Networks (PDNs), with each PDN being identified by its associated APN; and means for processing PDN connections and/or PDN disconnections in order to support said offloading of said selected traffic. Such means (1001) for obtaining, means (1003) for receiving, and means (1005) for processing could be implemented as individual hardware components within the MME 1000. Alternatively, at least one of such means could be implemented as software stored in memory 1002 (or some other storage device) and executable by a processor or controller 1004. Cooperation with various network entities such as the HSS, local gateways, etc. can be performed by sending and receiving signals and information via a transceiver 1006 under the control of the processor/controller 1004.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support the particular traffic offload via a local network techniques described herein.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method comprising:
    obtaining, by a Mobility Management Entity (MME) from a Home Subscriber Server (HSS), subscription data for a user equipment (UE) defined based on an Access Point Name (APN),
    wherein the subscription data indicates whether traffic associated with the APN is prohibited for a Selected IP Traffic Offload (SIPTO), is allowed for a SIPTO excluding a SIPTO via Local Network (SIPTO@LN), and is allowed for a SIPTO including the SIPTO@LN;
    receiving, by the MME from a node communicating with the UE, information including a transport layer address of a local gateway (GW) capable of offloading selected traffic;

initiating, by the MME based on the subscription data which includes a SIPTO permission indicating that a user has provided consent to allow the SIPTO@LN, deactivation of a Packet Data Network (PDN) connection by sending to the UE a Non-Access Stratus (NAS) Deactivate Bearer Request message indicating that reactivation is required for the PDN connection; and in response to a reactivation attempt by the UE, selecting, by the MME based on the received information, the local GW to allow the SIPTO@LN to be performed via the local GW.

2. The method of claim 1, wherein the local GW is reachable by a Home eNodeB (eNB).

* * * * *